United States Patent [19]
Kitayama et al.

[11] Patent Number: 5,812,805
[45] Date of Patent: Sep. 22, 1998

[54] METHOD AND EDITING SYSTEM FOR SETTING TOOL BUTTON

[75] Inventors: Fumihiko Kitayama, Yokohama; Kazushi Kuse, Fujisawa, both of Japan

[73] Assignee: International Business Machines Corp., Armonk, N.Y.

[21] Appl. No.: 617,463

[22] Filed: Mar. 18, 1996

[30] Foreign Application Priority Data

May 31, 1995 [JP] Japan .................................. 7-133743

[51] Int. Cl.$^6$ ...................................................... G06F 3/00
[52] U.S. Cl. ............................................ 395/354; 395/333
[58] Field of Search .................................. 395/352, 354, 395/333, 334, 339, 348, 349

[56] References Cited

U.S. PATENT DOCUMENTS

| | | | |
|---|---|---|---|
| 5,450,539 | 9/1995 | Ruben ....................................... | 395/354 |
| 5,490,245 | 2/1996 | Wugofski ................................ | 395/159 |
| 5,500,936 | 3/1996 | Allen et al. ............................ | 395/156 |

OTHER PUBLICATIONS

"Quick and Easy Applications: Ingress/Windows 4Gh offers Interactive Way to Build Portable, Graphic–Based Apps," UNIX Today (24 Jun 1991) p. 52.

*Primary Examiner*—Raymond J. Bayerl
*Assistant Examiner*—A. Katbab
*Attorney, Agent, or Firm*—A. Bruce Clay

[57] ABSTRACT

A method of flexibly setting a tool button with user operation, comprises the steps of specifying commands for making a desired editing object and also of specifying parameters of the editing object. An editing object is generated on a display screen based upon the specified commands and the specified parameters. The object displayed on the display screen may be selected with a pointing device and related to a tool button. The specified command and the specified parameters of the object are then set to the related tool button. The first display form of the tool button may be changed to a second display form corresponding to the specified command and/or the specified parameters.

8 Claims, 4 Drawing Sheets

METHOD AND EDITING SYSTEM FOR SETTING TOOL BUTTON

FIELD OF THE INVENTION

The present invention relates to a method of and an editing system for setting tool buttons, and more particularly, to a method and system in which tool buttons can be arbitrarily set by a user.

BACKGROUND OF THE INVENTION

There is an increase in the number of application programs that have a highly functional user's interface in which users can graphically display an object being currently edited and can operate on the object directly so that it can be easily edited and processed. In particular, in application programs having a graphic edit function, there is demand for high functionality of the user's interface. This is because there are a large number of physical operations that a user has to execute to generate a graphic object.

However, in order for a user to make an editing object such as a graphic object, it is necessary to at least specify commands and parameters of an editing object. As used herein, "command" means a standard command that a system executes, and more specifically, commands for generation of a graphic object (for example, circle or rectangle), change of a graphic object, and synthesis of graphic objects. Also, "parameters of an editing object", as referred to herein, are representative of, for example, color, line kind, line width, and existence of hatching of an object to be generated. When a circle of a thin line is made with a solid line, a user needs to specify a command for "generation of a circle" and also specify parameters for "solid line" and "thin line."

Conventional user interfaces, provide fixed tool buttons. A plurality of unchangeable tool buttons are limitedly provided in advance such that a user operates the tool buttons only to some small degree. The user's interface can be realized relatively simply; however, in applications that different users use in different ways, it cannot be said that they are convenient for all users. This is due to the fact that some functions may be used many times by one, but seldom by others. Also, the system has the limitation that users cannot freely change the settings of a tool button. In particular, in application programs where various parameters of various editing objects have to be specified in addition to specification of commands, this conventional interface is not always friendly to users.

Also, even if tool buttons can be changed to some degree, there is still no known user's interface in which the parameters of an editing object are objects that can be customized and easily customized visually.

Thus, in application programs where commands and various parameters of various editing objects have to be specified, conventional tool buttons are not always an interface friendly to users. Accordingly, an object of the present invention is to make it possible to set a command and each parameter of an editing object to a tool button by a user directly operating the object being displayed on the screen. Also, another object of the present invention is to provide tool buttons which users can easily customize visually. Further, still another object of the present invention is to provide flexible tool buttons in which the commands and the parameters of an editing object, previously set in a tool button, can be easily reset visually.

To solve the problems described above, there is provided a method of flexibly setting a tool button with user operation, comprising the steps of:

specifying commands for making a desired editing object and also specifying parameters of the editing object;

generating on a display screen the editing object based on the specified commands and the specified parameters;

selecting the object on said display screen by a user;

specifying a predetermined tool button displayed on said display screen by the user so that the selected object is related to said predetermined tool button; and setting the specified commands and the specified parameters of the object to the related tool button.

Also, the above-described method of the present invention may further comprise the step of changing a display form of the tool button displayed on the display screen to a display form corresponding to the parameters that are set.

The editing object and the tool button can be related by moving a pointer around on the display with a pointing device and performing a drag operation.

Also, in accordance with another important aspect of the present invention, there is provided a method of flexibly setting a tool button with user operation, comprising the steps of:

specifying commands for making a desired editing object and also specifying parameters of the editing object;

generating on a display screen the editing object based on the specified commands and the specified parameters;

selecting the object displayed on the display screen, with a pointing device;

specifying a tool button, displayed at its first display form on said display screen, with the pointing device so that the selected object is related to the tool button;

setting the specified commands and the specified parameters of the object to the related tool button; and changing the first display form of the tool button to a second display form corresponding to the specified commands or the specified parameters and displaying the tool button at the second display form.

Further, in accordance with still another important aspect of the present invention, there is provided an editing system comprising:

displaying means for displaying on a display screen at least one tool button and an editing object, the object being generated with a predetermined command and having at least one parameter;

input means for specifying the object displayed on the display screen and specifying one of said at least one tool button;

operation storage means for storing the command and data on a desired parameter of said at least one parameter so that they are related; and processing means which, when the editing object and the tool button are specified by the input means, obtains the command with which the object is generated and obtains the desired parameter the object has and which writes in the command and data on the desired parameter stored in the operation storage means so that they are related.

The editing system may further comprise means for changing a display form of the tool button displayed on said display screen to a display form corresponding to said command and data on said parameter stored in said operation storage means.

BRIEF DESCRIPTION OF THE DRAWINGS

For a more complete understanding of the present invention, and for further advantages thereof, reference is now made to the following Detailed Description taken in conjunction with the accompanying drawings in which.

DETAILED DESCRIPTION OF THE INVENTION

Figure 1:
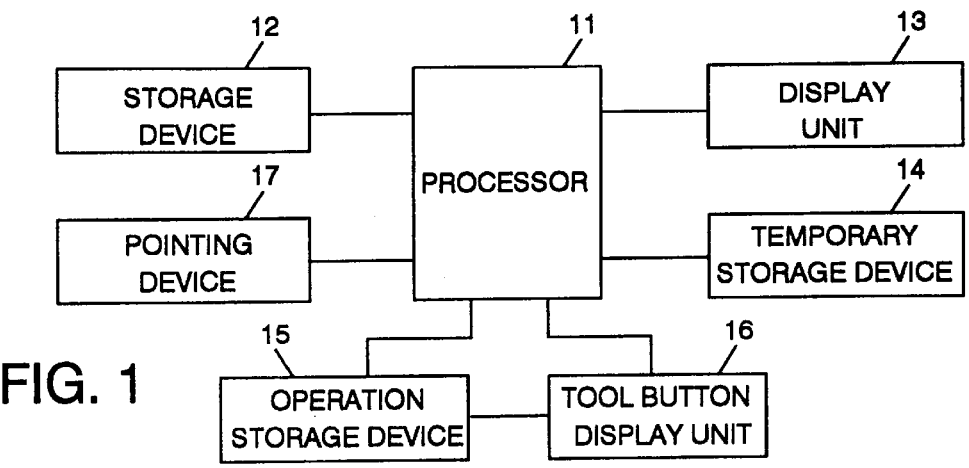
FIG. 1 is a block diagram showing a system constructed in accordance with an embodiment of the present invention.

FIG. 1 is a block diagram showing a computer system constructed in accordance with an embodiment of the present invention. A processor 11 controls the execution of processing programs for performing the generation and editing of a graphic object. A storage device 12, a display unit 13, a temporary storage device 14, an operation storage device 15, and a tool button display unit 16 are connected to the processor 11. An edit operation and a tool button definition operation are performed by a user with a pointing device 17.

The storage device 12 stores the processing programs for executing the generation and editing of a graphic object. The display unit 13 displays a graphic object, which is generated with a predetermined command and is an editing object having a plurality of parameters. The display unit 13 also displays a plurality of tool buttons. Further, a pointer, which can be moved and specified with the pointing device 17, is displayed on the display unit 13. The temporary storage device 14 is a device for temporarily storing data being displayed, such as data on a graphical object. The operation storage device 15 stores commands and desired parameters of an editing object, when a user sets the content of a tool button. When both the editing object and the tool button are specified with the pointing device 17, the processor 11 obtains the command with which the editing object was generated and also obtains data on desired parameters of the editing object, and writes the command and data on the desired parameters, which has been stored in the operation storage device 15, so that the object, data and commands are related. Further, the tool button display device 16 changes the form of a tool button which is displayed on the screen, according to the edit mode stored in the operation storage device 15.

Figure 2:
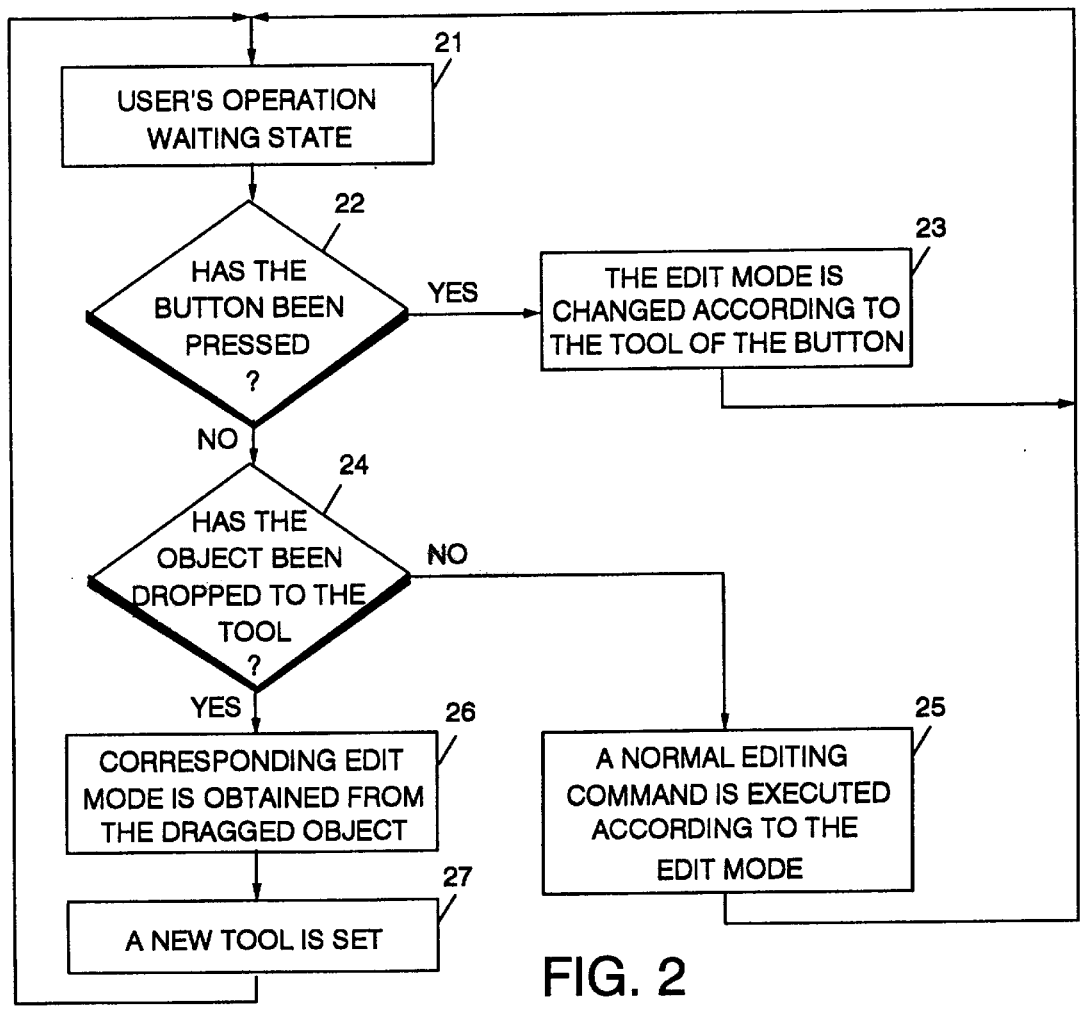
FIG. 2 is a flowchart showing the editing procedure of the embodiment of FIG. 1.

FIG. 2 is a flowchart showing the editing procedure in the embodiment of the present invention as described above in connection with FIG. 1. A description is herein made of an example in which some edit mode has been set in the tool button and where the editing procedure is started from the user's operation waiting state (step 21). Note that the data on this edit mode has been stored in the operation storage device 15 but does not need to be set initially. A user generates a desired graphic object by inputting a command, specifying it, and specifying parameters of an editing object.

During the process of editing, it is decided if the tool button being displayed on the screen of the display unit 13 has been selected with the pointer (step 22). When the tool button is selected, the edit mode of an editing system is changed according to the edit mode which was set in that tool button (step 23). Thereafter, step 23 returns to the user's operation waiting state (step 21).

When the tool button has not been selected, it is decided if the editing object being displayed on the screen has been dropped to the tool button (step 24). This is usually done by specifying a predetermined area on the display screen with the pointing device 17, specifying an editing object contained in that area, and dropping the specified object to a tool button with a drag operation. In this case, the command on the editing object and the data on the parameters of the object are stored in the temporary storage device 14. With a drop operation to a desired tool button, these are related to the tool button. When the drop operation to a desired tool button is not performed, a desired command is executed with a desired parameter, according to the edit mode at that time and the user's operation performed (step 25). Thereafter, step 25 returns to the user's operation waiting state (step 21).

When the drop operation is performed, corresponding predetermined data is extracted by the processor 11 from the specified editing object (step 26). More specifically, this is attained by the processor 11 extracting the information on a command and the data on the parameter of an editing object from the graphic object specified by a user. The command used herein means a standard command that a system executes, and more specifically, there are commands for generation of a graphic object, change of a graphic object (for example, circle or rectangle), change of a graphic object, and synthesis of graphic objects. The parameters of an editing object are representative of color, line kind, line width, and existence of hatching of an object to be generated. This predetermined data is stored in the operation storage means 15.

Based on the data obtained, a new tool is obtained (step 27). In this case, the screen display of the tool button is changed to a display form corresponding to the data that has been set. This makes it possible for a user to visually recognize the content set in the tool button. This point will be further described below. A change in the display of this tool button is performed by the tool button display unit 16. After this tool button is obtained, step 27 returns to the user's operation waiting state (step 21).

Figure 3A:
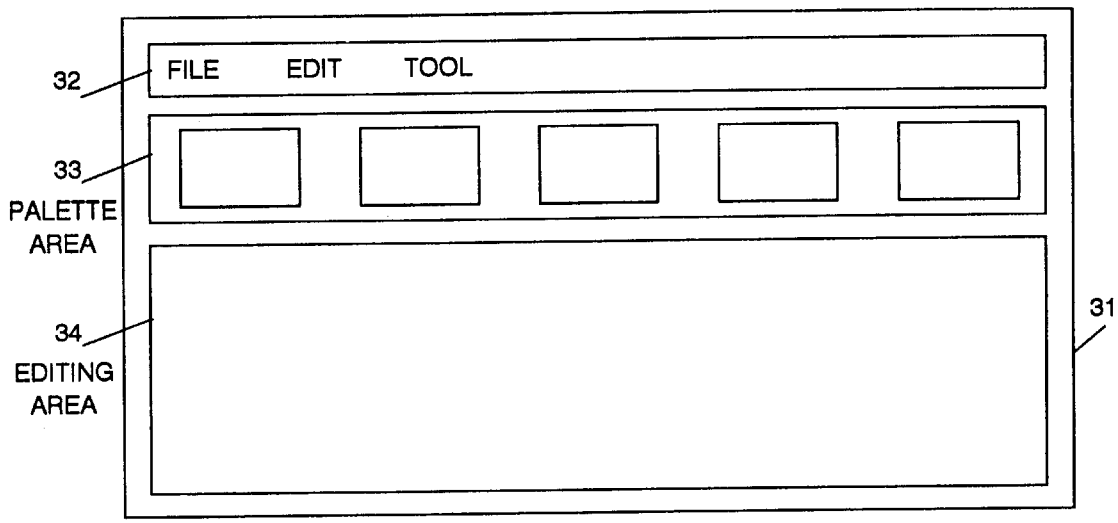
FIGS. 3A and 3B illustrate an example of an edited window being displayed on a computer screen.
Figure 3B:
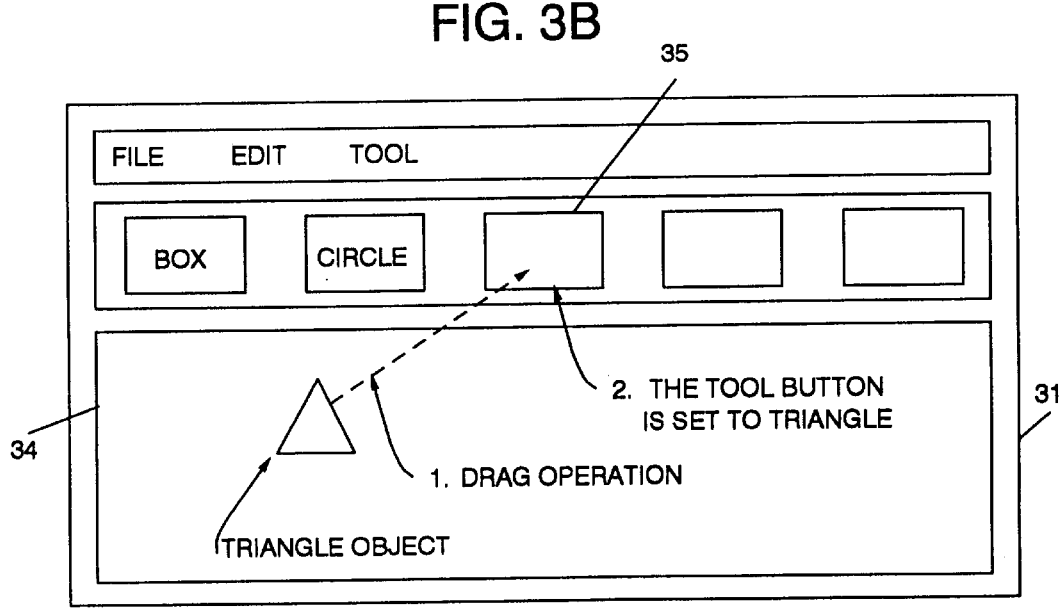

A specific setting method of the tool button will now be described with the setting of a graphic object as an example. Referring now to FIGS. 3a and 3b, there is shown an example of an editing window displayed on a display screen 31. Also shown on the Screen 31 are a menu bar 32, a palette area 33 with a plurality of tool buttons, and an editing area 34. First, an editing object is generated in the editing area 34. More specifically, a command for "generation of Triangle" is selected from a pull-down menu of "Edit" found on the menu bar 32. In the case of this example, "Triangle" in the pull-down menu (not shown) is selected. In addition, parameters representative of a line width, a line kind, and an existence (or non-existence) of hatching are specified to generate a triangle of predetermined size at a predetermined place on the editing area 34.

After a triangle is selected as an editing object with the pointing device, the triangle is associated with the tool button 35 (FIG. 3b) in the palette area 33 with a drag operation. In this tool button 35, the command for "generation of Triangle" and the specified parameters for a line width and a line kind are set.

Additionally, the display form of the tool button 35 is changed from the state where nothing has been displayed to the state where "Triangle" is displayed. When the setting is completed, a user will thereafter be able to generate a triangle having the set parameters by selecting the tool button 35 in the same manner as any other conventional tool button.

Note that for parameters to be set in a tool button, all of a plurality of parameters, which an editing object has, may be set, or only some of them may be set. For example, in the case of the triangle described above, parameters representative of the line width and line kind of an editing object are set, but a parameter representative of an existence of hatching does not always need to be set in a tool button. Further, parameters may arbitrarily be set from a setting menu by a user. If done in this manner, the user's edit efficiency will be further enhanced.

Figure 4A:
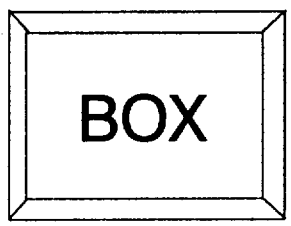
FIGS. 4A, 4B, 4C and 4D illustrate the different display forms of a tool button for a rectangle in which different parameters have been set.
Figure 4A:
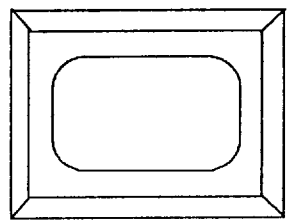
Figure 4B:
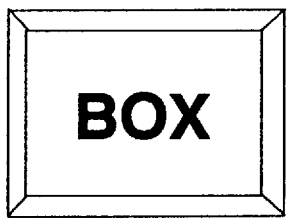
Figure 4B:
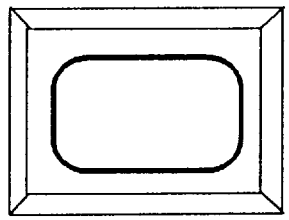
Figure 4C:
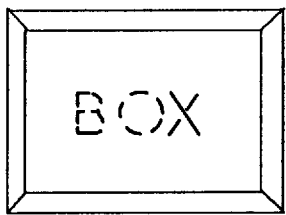
Figure 4C:
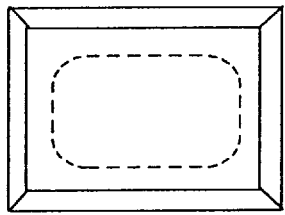
Figure 4D:
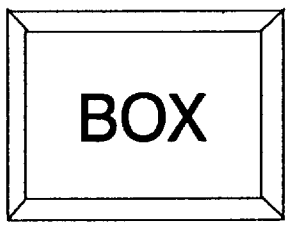
Figure 4D:
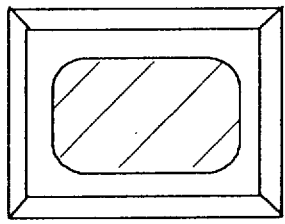

It is preferable that the display form of a tool button be changed according to the content of a parameter that is set. FIGS. 4A–D illustrate the different display forms of a tool button for a rectangle in which different parameters have been set. FIG. 4A illustrates a case where "normal" has been set for a line width, FIG. 4B a case where "bold" has been set for a line width, FIG. 4C a case where "broken line" has been set for a line kind, and FIG. 4D a case where a rectangle has been hatched. Thus, the display form of the tool button is changed according to a parameter that is set, so a user can visually recognize the content of the setting. As a result, an interface, which is friendly to users, can be realized.

Figure 5:
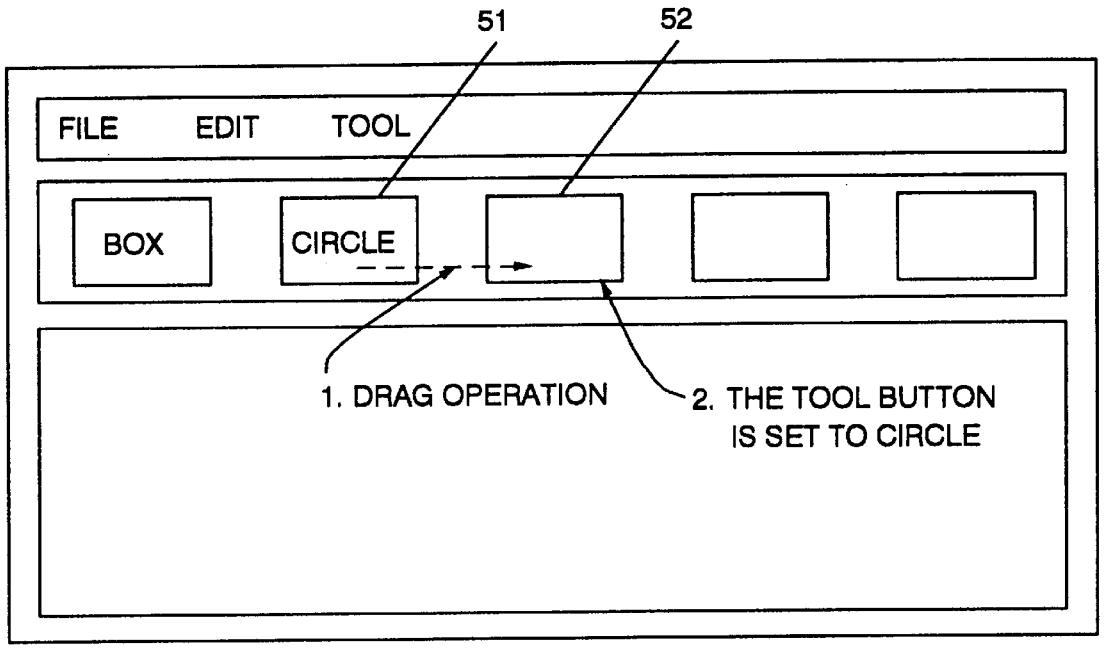
FIG. 5 illustrates a case where the set content of one tool button is copied to another tool button.

Further, the content of the setting of a tool button can be easily changed by a method such as will be described below. FIG. 5 illustrates an example in which the set content of one tool button is copied to another tool button. In this example a tool button 51 for generating a circle has been set. These settings can be easily copied with a drag operation to a tool button 51 in which nothing has been previously set. In this manner, another tool button having the same function can be easily set.

Figure 6:
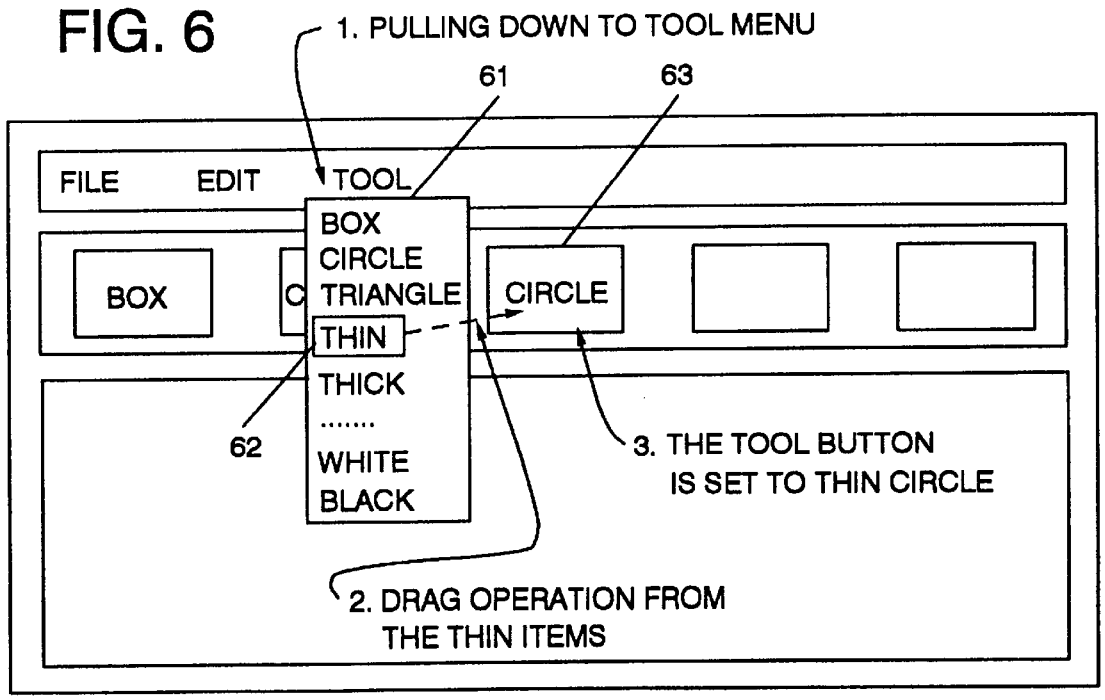
FIG. 6 illustrates an example in which the parameter that was set in a tool button is changed.

FIG. 6 shows an example in which the parameter that was set in a tool button is changed. In this example, a pull-down menu 61 will be displayed if "Tool" is selected from a menu bar. Next, "Thin" 62 is associated with the drag operation to a tool button 63 which has already been set. Then, the parameter for a line width, which has been set in this tool button, is changed to a thin line. In this manner, by selecting other parameters displayed on the display screen with a pointing device and relating the other parameters to the above-described tool button, the parameters set in the above-described tool button can be easily changed to other parameters.

As has been described herein, the present invention allows a user to directly operate an editing object being displayed on the screen so that both a command and each parameter of the editing object can be set to a tool button. In addition, the user can easily customize the tool button's appearance. Moreover, since the command set in the tool button and the parameter of the editing object can be easily reset visually, a flexible user's interface can be provided.

Although the present invention has been described with respect to a specific embodiment thereof, various changes and modifications may be suggested to one skilled in the art, and it is intended that the present invention encompass such changes and modifications as fall within the scope of the appended claims.

We claim:

1. A method of selectively setting a tool button for executing an editing object on a computer screen with user operation, comprising the steps of:

specifying commands for execution upon selection of the tool button and parameters for a desired editing object, said parameters comprising characteristics of said desired editing object;

relating said desired editing object to the tool button in order to set said commands and said parameters of said desired editing object to the tool button; and displaying on the computer screen said desired editing object based upon said commands and said parameters.

2. The method of claim 1, wherein said tool button displayed on said computer screen has a display form corresponding to said parameters.

3. The method of claim 1, wherein said editing object and said tool button are directly specified with a drag operation of a pointing device so that said editing object is related to said tool button.

4. The method of claim 1, wherein said parameters set in said tool button can be changed by specifying other parameters displayed on said screen with a pointing device so that said other parameters are related to said tool button.

5. A system for selectively setting a tool button for executing an editing object on a computer screen with user operation, comprising:

means for specifying commands for execution upon selection of the tool button and parameters for a desired editing object, said parameters comprising characteristics of said editing object;

means for relating said desired editing object to the tool button in order to set said commands and said parameters of said desired editing object to the tool button; and means for displaying on the computer screen said desired editing object based upon said commands and said parameters.

6. The system of claim 5, wherein said tool button displayed on said computer screen has a display form corresponding to said parameters.

7. The system of claim 5, wherein said editing object and said tool button are directly specified with a drag operation of a pointing device so that said editing object is related to said tool button.

8. The system of claim 5, wherein said parameters set in said tool button can be changed by specifying other parameters displayed on said screen with a pointing device so that said other parameters are related to said tool button.

* * * * *